(12) United States Patent
Wen-Kuei

(10) Patent No.: US 8,519,636 B2
(45) Date of Patent: *Aug. 27, 2013

(54) AC LED APPARATUS

(75) Inventor: Tsai Wen-Kuei, Taipei (TW)

(73) Assignee: GE Investment Co., Ltd., Taipei (TW)

( * ) Notice: Subject to any disclaimer, the term of this patent is extended or adjusted under 35 U.S.C. 154(b) by 316 days.

This patent is subject to a terminal disclaimer.

(21) Appl. No.: 12/985,757

(22) Filed: Jan. 6, 2011

(65) Prior Publication Data

US 2011/0266961 A1    Nov. 3, 2011

Related U.S. Application Data

(63) Continuation-in-part of application No. 12/829,778, filed on Jul. 2, 2010, now Pat. No. 8,362,711.

(60) Provisional application No. 61/330,611, filed on May 3, 2010.

(51) Int. Cl.
 *H05B 37/02* (2006.01)
(52) U.S. Cl.
 USPC ......... 315/291; 315/209 R; 315/225; 315/307
(58) Field of Classification Search
 USPC ............. 315/152, 154, 185 R, 186, 191–193, 315/209 R, 210, 224, 246, 291, 307, 308; 362/227, 249.05, 249.12, 800; 323/282, 323/283
 See application file for complete search history.

(56) References Cited

U.S. PATENT DOCUMENTS

| 7,081,722 | B1 * | 7/2006 | Huynh et al. ................. 315/323 |
| 7,518,316 | B2 | 4/2009 | Yu |
| 7,638,954 | B2 * | 12/2009 | Kunimatsu et al. ........... 315/291 |
| 2002/0047593 | A1 | 4/2002 | Guthrie et al. |
| 2002/0047596 | A1 | 4/2002 | Guthrie et al. |
| 2004/0233145 | A1 | 11/2004 | Chiang |
| 2007/0258176 | A1 * | 11/2007 | Ball et al. ........................ 361/56 |
| 2008/0094000 | A1 * | 4/2008 | Yamamoto et al. ........... 315/250 |
| 2008/0203932 | A1 | 8/2008 | Ball |
| 2008/0224623 | A1 | 9/2008 | Yu |
| 2010/0264834 | A1 * | 10/2010 | Gaines et al. ................. 315/152 |
| 2011/0084615 | A1 * | 4/2011 | Welten .......................... 315/152 |

FOREIGN PATENT DOCUMENTS

| DE | 10 2006 024 607 A1 | 11/2007 |
| EP | 1 711 038 A1 | 10/2006 |
| EP | 2 254 392 A2 | 11/2010 |
| WO | WO 2006/039789 A1 | 4/2006 |

* cited by examiner

*Primary Examiner* — Jimmy Vu
(74) *Attorney, Agent, or Firm* — Muncy, Geissler, Olds & Lowe, PLLC

(57) ABSTRACT

An alternating-current (AC) light-emitting diode (LED) apparatus is disclosed. A rectifier rectifies a power AC voltage to generate a rectified voltage, which is monitored by a controller. A number of LEDs are electrically coupled between the rectified voltage and a ground. A number of switches correspondingly control at least a portion of the LEDs respectively, wherein one terminal of each switch is electrically coupled to one electrode of the corresponding LED or LEDs. The switches are controlled by the controller according to the rectified voltage.

19 Claims, 17 Drawing Sheets

AC LED APPARATUS

CROSS-REFERENCE TO OTHER APPLICATIONS

The present invention is a continuation in part (CIP) of U.S. patent application Ser. No. 12/829,778, filed on Jul. 2, 2010, now U.S. Pat. No. 8,362,711 entitled "AC LED APPARATUS," which claims the benefit of U.S. Provisional Application Ser. No. 61/330,611 filed on May 3, 2010, the complete subject matter of which is hereby incorporated herein by reference in its entirety.

BACKGROUND OF THE INVENTION

1. Field of the Invention

The present invention generally relates to light-emitting diode (LED), and more particularly to an alternating-current (AC) LED lamp.

2. Description of Related Art

A light-emitting-diode (LED) lamp uses LEDs as a light source. The LED lamp has a longer lifetime and consumes less energy than a conventional fluorescent lamp, and is thus becoming more acceptable as a lighting device.

The LED is commonly driven by a direct-current (DC) power supply or an alternating-current (AC) to DC converter such as a switching power supply. However, the conversion efficiency of the conventional switching power supply is at best 90% and is oftentimes lower than that. Moreover, the conventional switching power supply is bulky due to its use of large capacitor and/or inductor.

In addition, the LED lamp is adapted to a specific AC power in a specific region or country. The voltage of the AC power varies in the range 100-240 volts, and the frequency of the AC power is either 50 Hz or 60 Hz. Accordingly, an LED lamp made for a region cannot be used in another region, without thorough reconstruction.

Another drawback of the conventional LED lamp is its susceptibility to power noise that will make the lamp flicker. The power noise may be reduced, however, at the cost of using more capacitors and/or inductors.

For the reason that the conventional LED lamp could not effectively and efficiently provide the purpose of lighting, a need has arisen to propose a novel LED lamp that has high power efficiency, lower volume, better adaptability to a variety of power voltages or improved immunity to power noise.

SUMMARY OF THE INVENTION

In view of the foregoing, it is an object of the embodiment of the present invention to provide an alternating-current (AC) light-emitting diode (LED) apparatus with high power efficiency.

According to one embodiment, the AC LED apparatus at least includes a rectifier, a controller, a number of serial-connected LEDs and a number of switches. The rectifier is configured to rectify a power AC voltage to generate a rectified voltage. The controller is configured to monitor the rectified voltage. The LEDs are electrically coupled between the rectified voltage and a ground. The switches correspondingly control at least a portion of the LEDs respectively, wherein one terminal of each switch is electrically coupled to one electrode of the corresponding LED or LEDs. The switches are controlled by the controller according to the rectified voltage.

DETAILED DESCRIPTION OF THE INVENTION

Figure 1A:
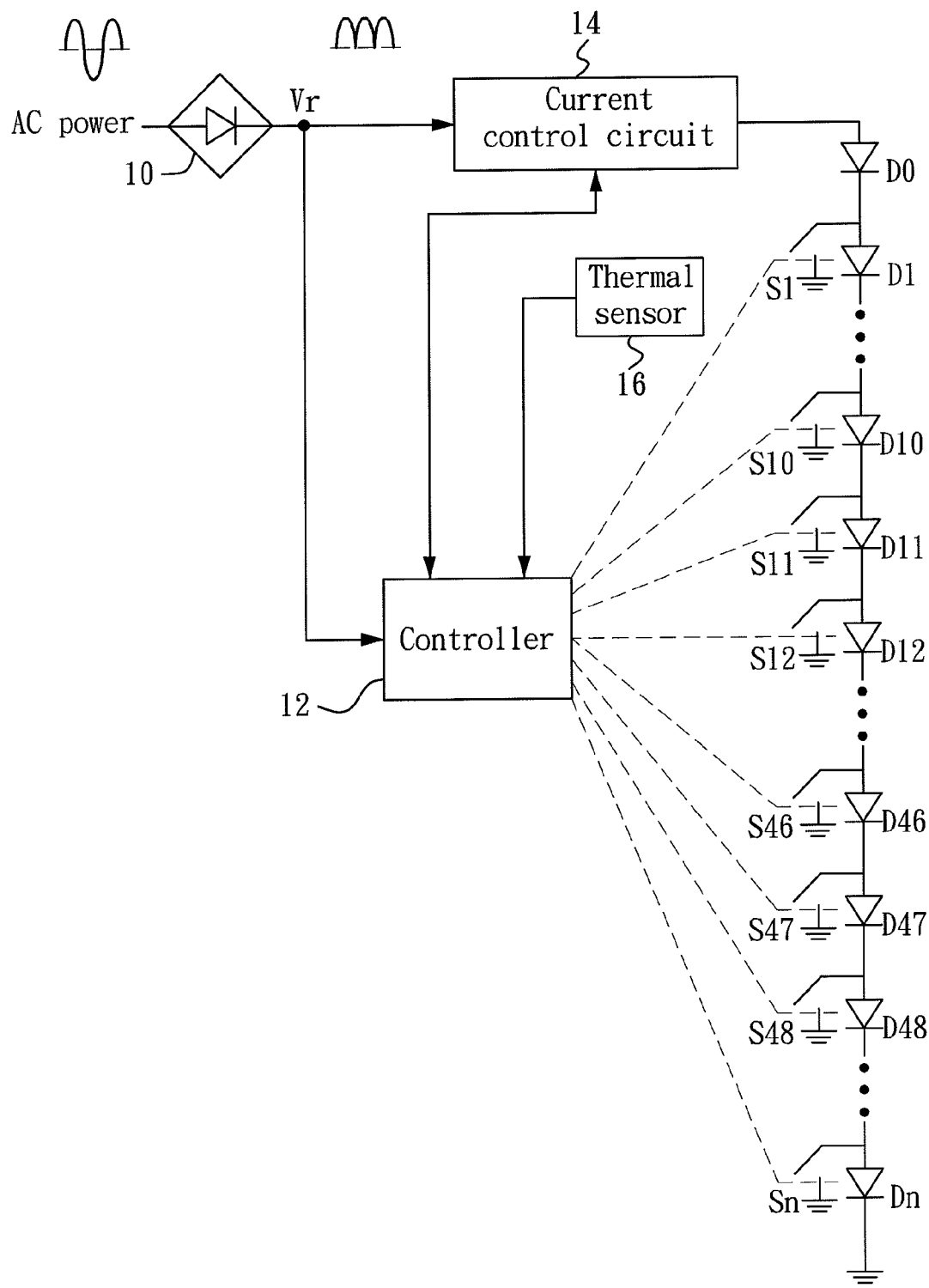
FIG. 1A shows an alternating-current light-emitting diode (AC LED) apparatus with high power efficiency according to one embodiment of the present invention.

FIG. 1A shows an alternating-current light-emitting diode (AC LED) apparatus with high power efficiency according to one embodiment of the present invention. The AC LED apparatus may operate on AC power without the need for a direct-current (DC) converter. Although the LED is adopted in the embodiment, other lighting device such as an organic light-emitting diode (OLED) may be used as well.

In the embodiment, the AC LED apparatus (e.g., an AC LED lamp) includes a rectifier such as a bridge rectifier 10 that passes the positive half-cycle of a power AC voltage (e.g., a sinusoidal waveform) and inverts the negative half-cycle of the power AC voltage, thereby resulting in a full-wave rectified voltage Vr. The rectified voltage Vr is monitored by a controller 12. The controller 12 may be, for example, a hard-wired circuit, a microprocessor, a programmable logic device (PLD), a programmable array logic (PAL) or any device that is capable of performing one or more functions that are described in this specification.

A number of serial-connected LEDs D0-Dn are electrically coupled between the rectified voltage Vr and the ground, configured with the LED current flowing from the rectified voltage Vr toward the ground. In this specification, the term "electrically couple" may mean that an electronic component or components are directly or indirectly connected by electricity. Although a sequence of serial-connected LEDs is illustrated in the embodiment, it is noted that, more than one sequence may be connected in parallel in other embodiment.

Figure 1B:
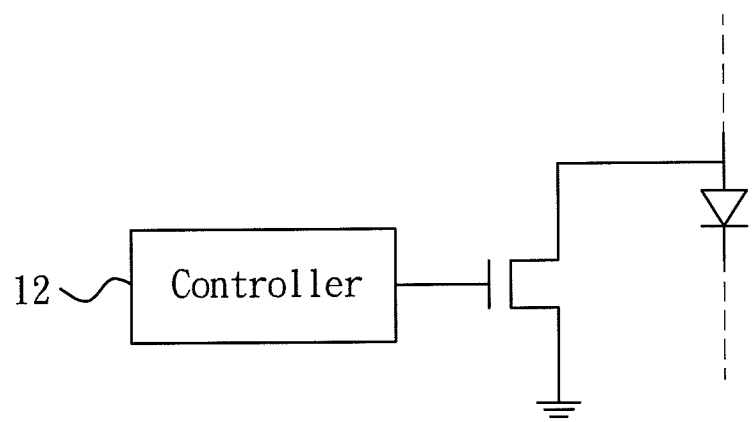
FIG. 1B shows a partial view of a power MOS device configured as a switch and a corresponding LED.
Figure 1C:
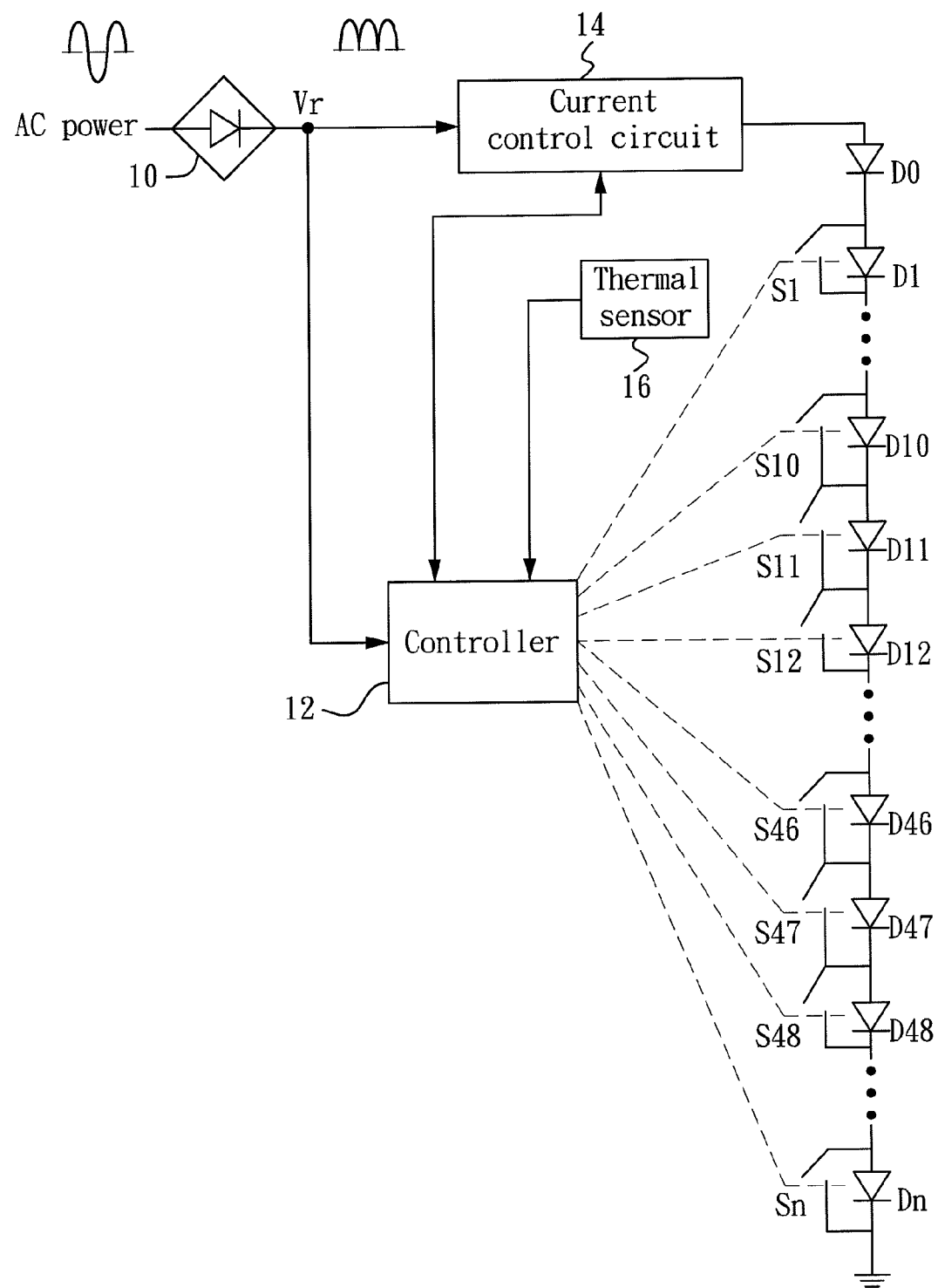
FIG. 1C shows an AC LED apparatus with alternative configuration of the switches.
Figure 1D:
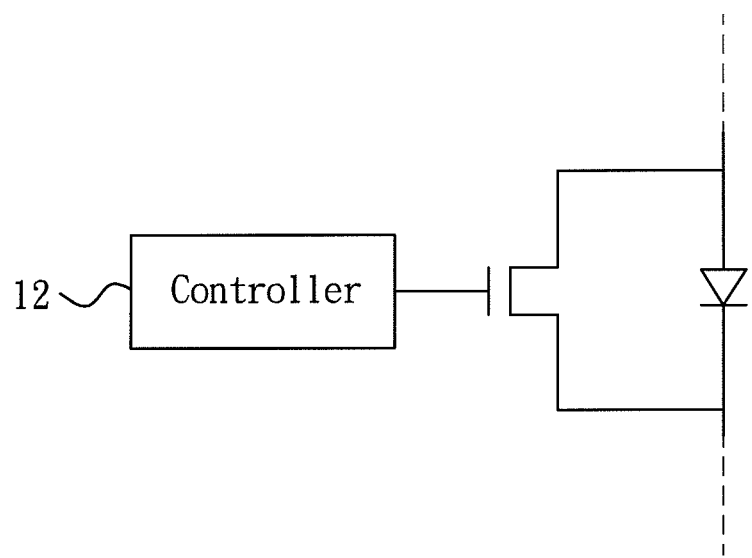
FIG. 1D shows a partial view of a power MOS device configured as a switch and a corresponding LED according to FIG. 1C.

In the present embodiment, one electrode (e.g., the anode) of each LED D1-Dn (except D0) is electrically coupled to one terminal of a corresponding switch S1-Sn. The other terminal of the switch S1-Sn is electrically coupled to the ground. As a result, when a switch (say switch 11) is closed, the corresponding LED (say LED 11) and all other LEDs (say LEDs D12-Dn with greater LED serial number) following it are turned off. In this and other embodiments, the LED D0 without corresponding switch is mainly used to prevent shorting between the rectified voltage Vr and the ground. It is appreciated by a person skilled in the pertinent art that more than one LED without corresponding switch may be used as well. The switches S1-Sn may be implemented, for example, by power metal-oxide-semiconductor (MOS) devices such as N-MOS, P-MOS or complementary MOS (CMOS). Although the MOS devices are illustrated here, it is appreciated that other types of transistor may be used as well. FIG. 1B shows a partial view of a power MOS device configured as a switch and a corresponding LED. Specifically, one of the source/drain is coupled to the ground, the other of the source/drain is coupled to the anode of the corresponding LED, and the gate is controlled by the controller 12. FIG. 1C shows an AC LED apparatus with alternative configuration of the switches S1-Sn. Specifically, one terminal of each switch S1-Sn is electrically coupled to the anode of the corresponding LED, and the other terminal of each switch S1-Sn is electrically coupled to the cathode of the corresponding LED. FIG. 1D shows a partial view of a power MOS device configured as a switch and a corresponding LED according to FIG. 1C. Specifically, one of the source/drain is coupled to the anode of the corresponding LED, the other of the source/drain is coupled to the cathode of the corresponding LED, and the gate is controlled by the controller 12. The switches S1-Sn are controlled by the controller 12 according to the rectified voltage Vr. Specifically speaking, the switches S1-Sn are controlled in the manner such that the number of turn-on LEDs is proportional to (or tracks) the magnitude of the rectified voltage Vr. Further, the cascaded forward voltage of the turn-on LEDs is approximately equal to the rectified voltage Vr. Accordingly, almost all the rectified power is converted to emitted light energy with high power efficiency. According to some calculations or experimentations, the power efficiency according to the embodiment may reach 90-98% or higher. Table 1 below shows some exemplary rectified voltages Vr and their corresponding closed switch and turn-on LEDs, supposed that the forward voltage of each LED is about 3.3 volts in this specific example. The switches not notified, particularly the switches (with smaller switch serial number) preceding the notified closed switch are open.

TABLE 1

| Vr | ... | 33 | 36.3 | ... | 151.8 | 155.1 | ... |
|---|---|---|---|---|---|---|---|
| Closed switch | ... | S11 | S12 | ... | S47 | S48 | ... |
| Turn-on LEDs | ... | D0-D10 | D0-D11 | ... | D0-D46 | D0-D47 | ... |
| Cascaded LED voltage | ... | 3.3 * 10 = 33 | 3.3 * 11 = 36.3 | ... | 3.3 * 46 = 151.8 | 3.3 * 47 = 155.1 | ... |

Another advantage of the AC LED apparatus of the present embodiment is its capability of being immune to noise in the power AC voltage. Specifically, when the controller 12 detects a noise signal that commonly has sharp waveform than the power AC voltage, the controller 12 may simply disregard the noise, and does not change status of the switches S1-Sn, thereby making the AC LED apparatus more resistant to noise and less flicker.

Furthermore, as the cascaded forward voltage may track the magnitude of the rectified voltage Vr, the AC LED apparatus according to the embodiment may be universally adapted to different power voltages and frequencies of various regions or countries.

The AC LED apparatus in the embodiment may further include a current control circuit 14 electrically coupled in series with the LEDs D0-Dn. As shown in FIG. 1A, the current control circuit 14 is electrically coupled between the rectified voltage Vr and the anode of the LED D0. One terminal of each switch S1-Sn is electrically coupled to the anode of the corresponding LED D1-Dn, and the other terminal of the switch S1-Sn is electrically coupled to the ground. It is noted that the current control circuit 14 may be disposed at a location other than that depicted in FIG. 1A. The current control circuit 14 may detect the LED current flowing in the serial-connected LEDs D0-Dn, for example, via a resistor connected in series with the LEDs D0-Dn. The detected-current result may then be fed to the controller 12. In one exemplary case, the controller 12 may appropriately adjust the number of turn-on LEDs or even shut down the entire sequence of the LEDs when the detected-current result indicates that the LED current exceeds a predetermined threshold. It is appreciated that the current control circuit 14 may be implemented by a variety of conventional current control circuits, and specific details of the current control circuit 14 are thus omitted for brevity.

Figure 1E:
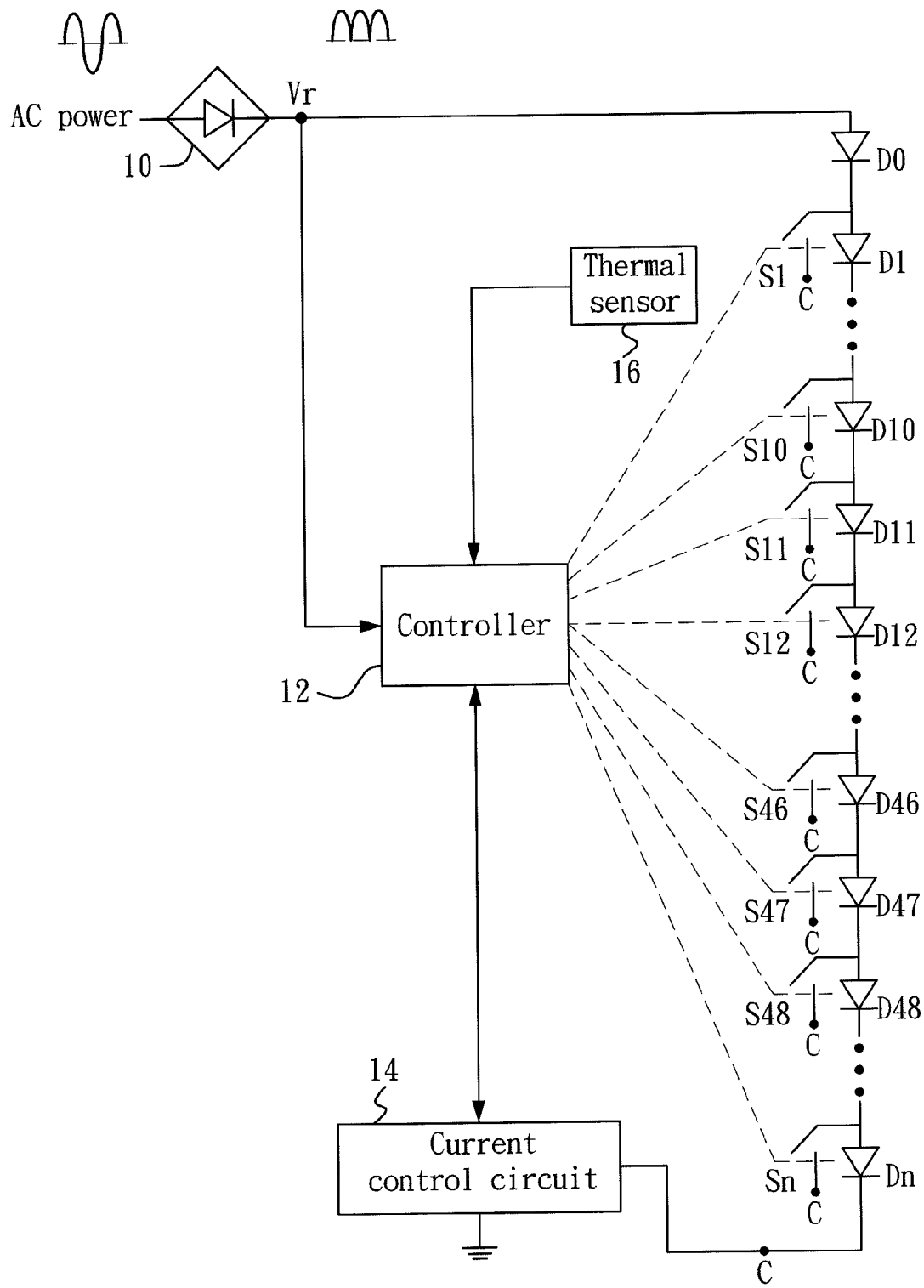
FIG. 1E to FIG. 1G show AC LED apparatus with alternative configuration of the current control circuit and the switches.

FIG. 1E shows an AC LED apparatus with alternative configuration of the current control circuit 14 and the switches S1-Sn. Specifically, the current control circuit 14 is electrically coupled between the cathode of the LED Dn and the ground. One terminal of each switch S1-Sn is electrically coupled to the anode of the corresponding LED D1-Dn, and the other terminal of the switch S1-Sn is electrically coupled to a common node C connected between the current control circuit 14 and the LED Dn. In this configuration, one of the source/drain of the power MOS device shown in FIG. 1B is coupled to the common node C, the other of the source/drain is coupled to the anode of the corresponding LED, and the gate is controlled by the controller 12.

Figure 1F:
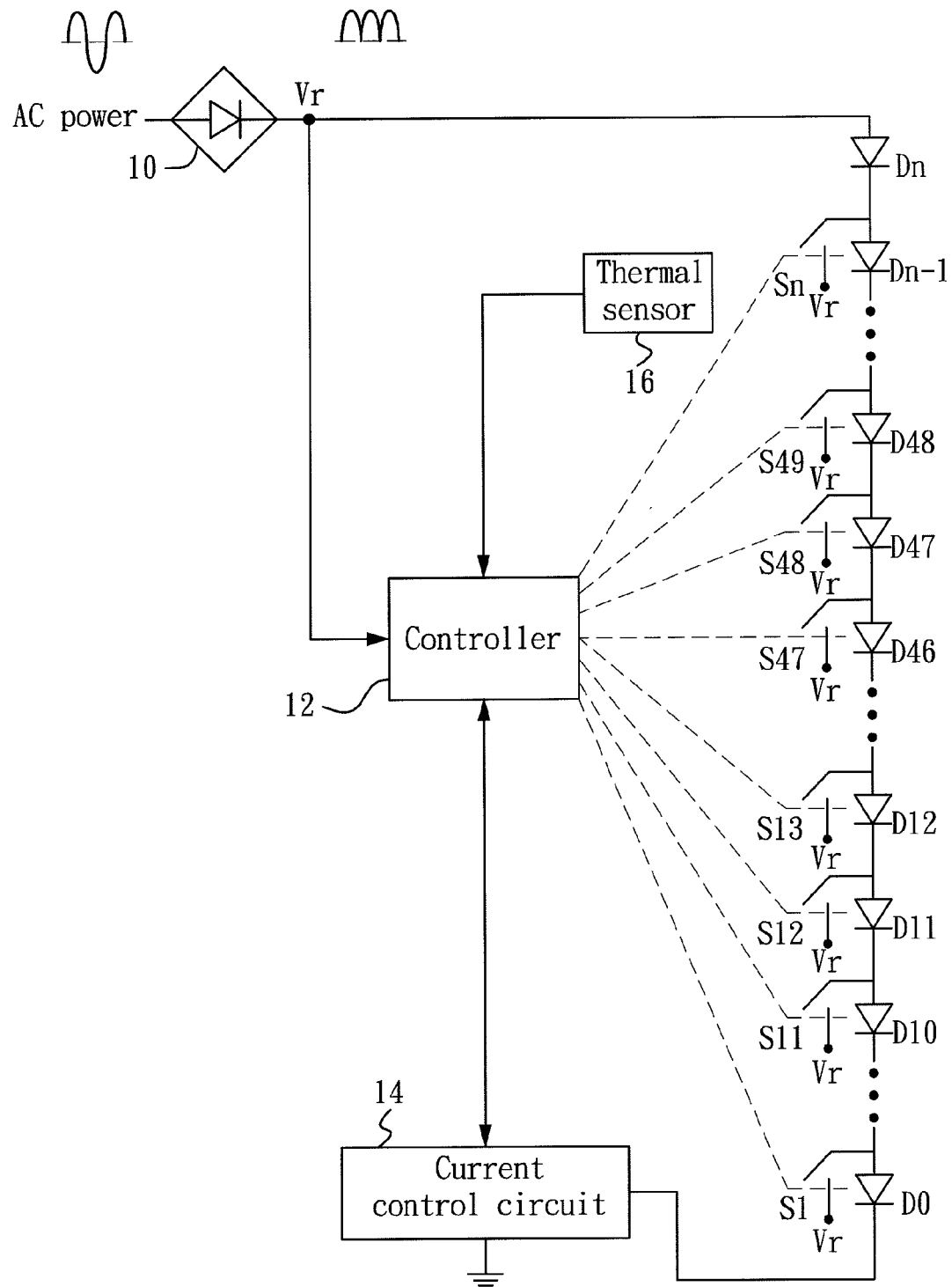

FIG. 1F shows an AC LED apparatus with alternative configuration of the current control circuit 14 and the switches S1-Sn. Specifically, the current control circuit 14 is electrically coupled between the cathode of the LED D0 and the ground. One terminal of each switch S1-Sn is electrically coupled to the cathode of the corresponding LED D1-Dn, and the other terminal of the switch S1-Sn is electrically coupled to the rectified voltage Vr. In this configuration, one of the source/drain of the power MOS device shown in FIG. 1B is coupled to the rectified voltage Vr, the other of the source/drain is coupled to the cathode of the corresponding LED, and the gate is controlled by the controller 12.

Figure 1G:
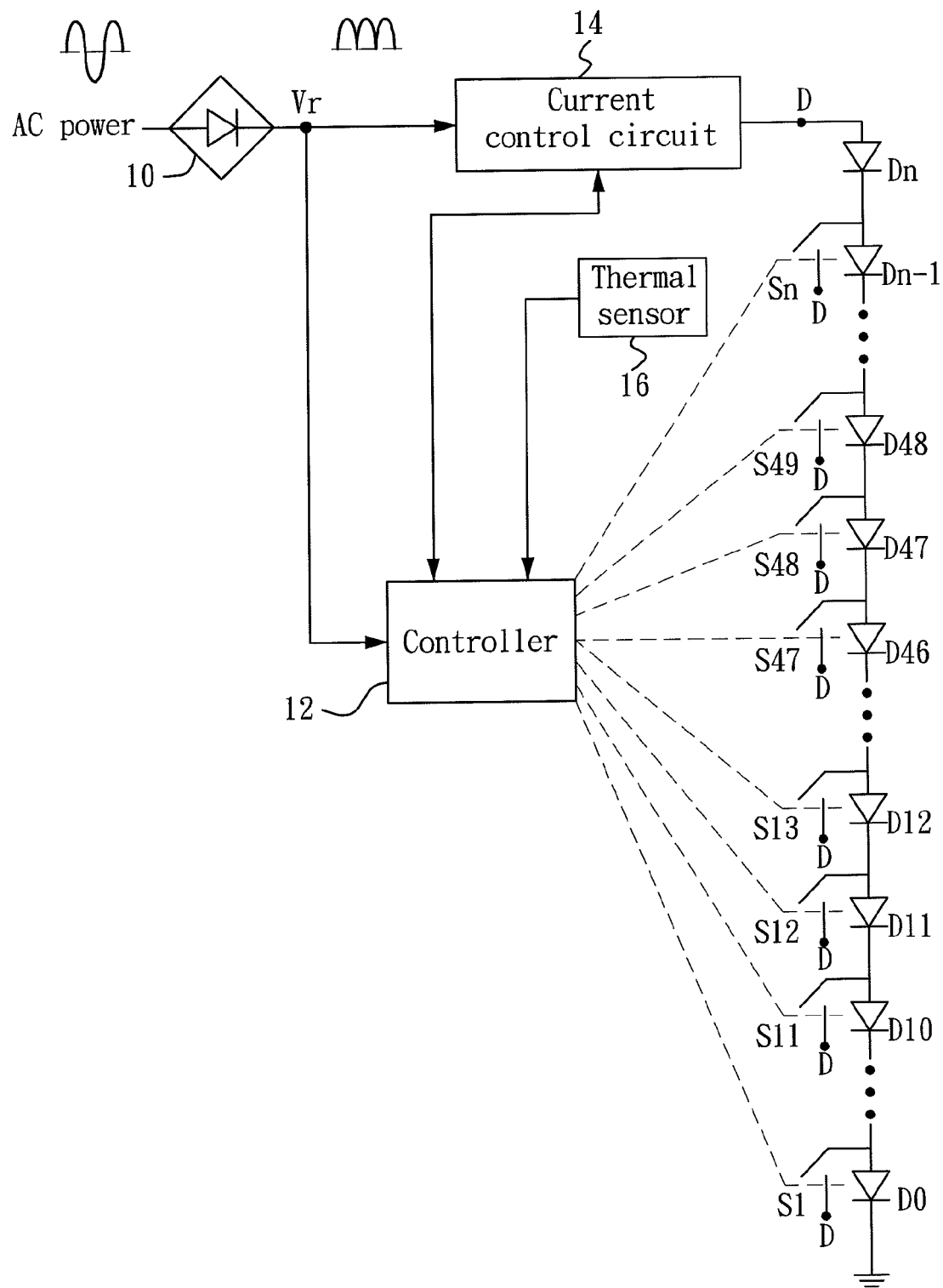

FIG. 1G shows an AC LED apparatus with alternative configuration of the current control circuit 14 and the switches S1-Sn. Specifically, the current control circuit 14 is electrically coupled between the rectified voltage Vr and the anode of the LED Dn. One terminal of each switch S1-Sn is electrically coupled to the cathode of the corresponding LED D1-Dn, and the other terminal of the switch S1-Sn is electrically coupled to a common node D connected between the current control circuit 14 and the LED Dn. In this configuration, one of the source/drain of the power MOS device shown in FIG. 1B is coupled to the common node D, the other of the source/drain is coupled to the cathode of the corresponding LED, and the gate is controlled by the controller 12.

The AC LED apparatus may further include a thermal sensor 16 that is used to detect the temperature (e.g., ambient temperature) of the LEDs D0-Dn. The detected-temperature result may then be fed to the controller 12. In one exemplary case, the controller 12 may increase the number of turn-on LEDs when the detected result indicates that the LED temperature exceeds a predetermined threshold, in order to compensate for the reduced LED forward voltage according to temperature effect. In another exemplary case, the controller 12 may reduce the LED current via the current control circuit 14 when the detected-temperature result indicates that the LED temperature exceeds a predetermined threshold, in order to protect the LEDs from being damaged. It is worthy of noting that some or all of the controller 12, the current control circuit 14, the LEDs D0-Dn, the switches S1-Sn and the thermal sensor 16 may be enclosed in a package.

Figure 2A:
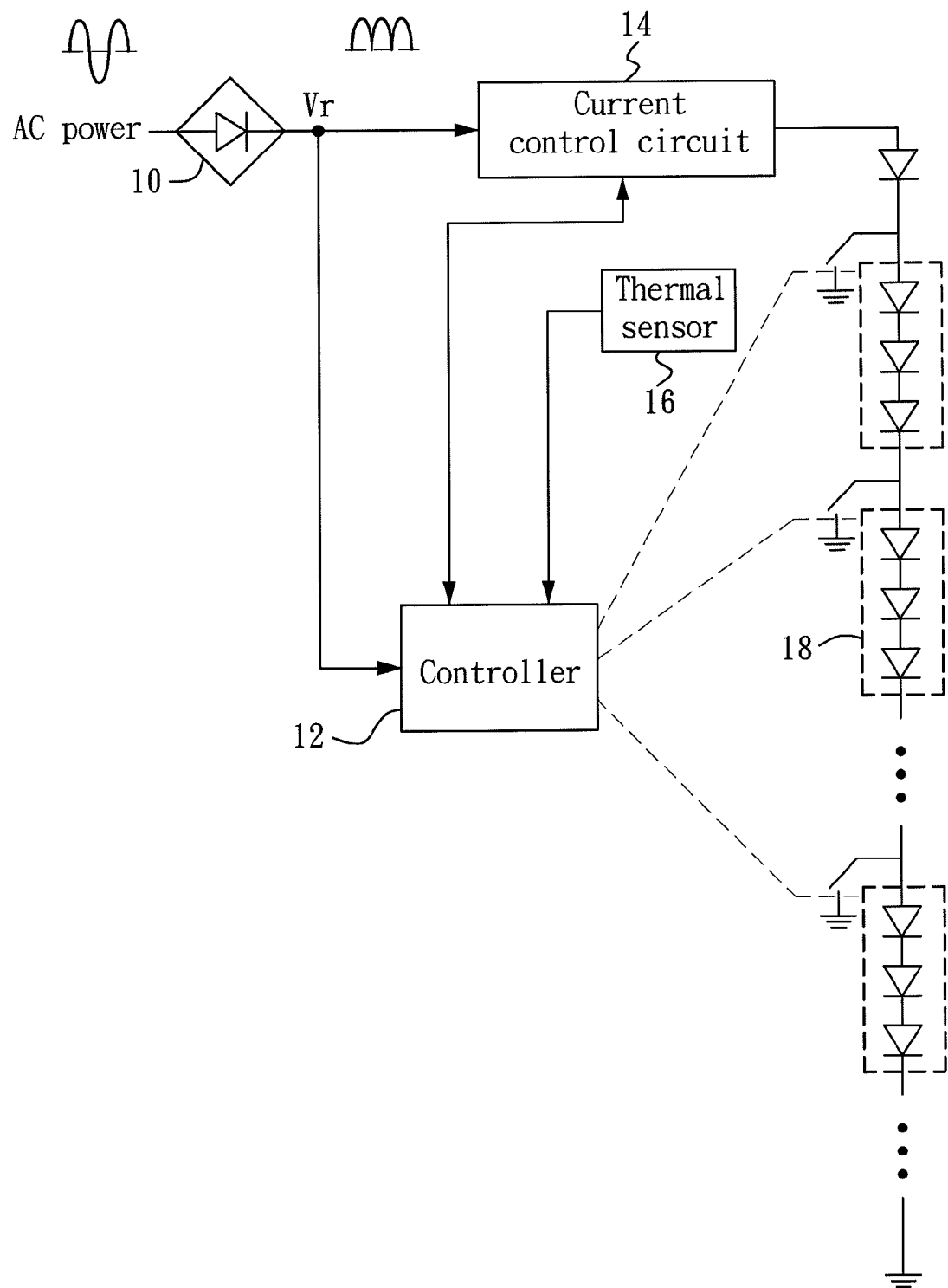
FIG. 2A shows an AC LED apparatus with high power efficiency according to another embodiment of the present invention.
Figure 2B:
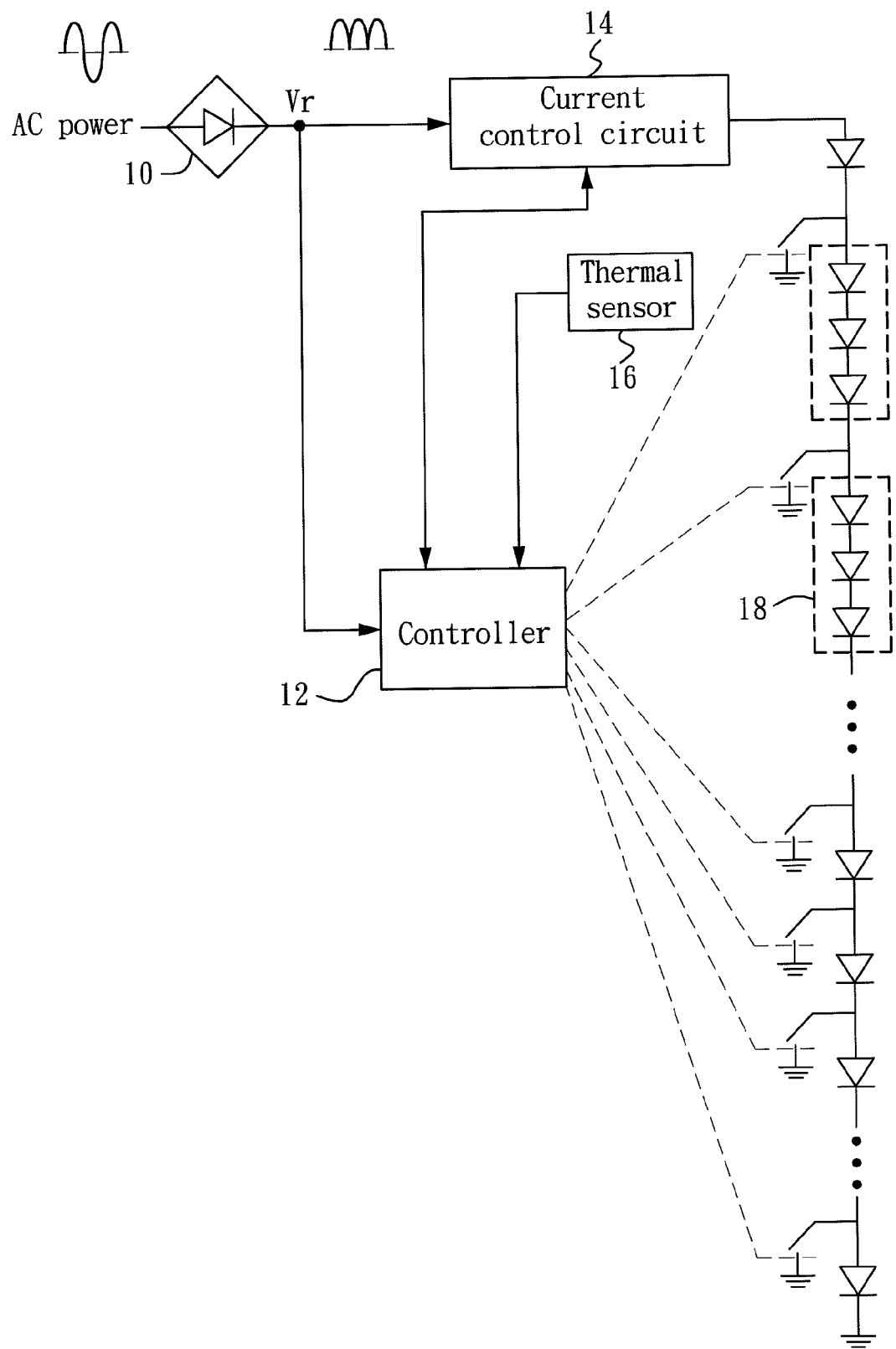
FIG. 2B shows an alternative AC LED apparatus to FIG. 2A.

FIG. 2A shows an AC LED apparatus with high power efficiency according to another embodiment of the present invention. The AC LED apparatus of the present embodiment is the same as the AC LED apparatus in FIG. 1A, except that each switch is associated with one or more LEDs (or a group of LEDs 18). As exemplified in FIG. 2A, every three LEDs 18 are grouped with a corresponding switch. It is noted that the number of the grouped LEDs 18 need not be the same for each group. FIG. 2B shows an alternative AC LED apparatus to FIG. 2A, in which some groups each contains three LEDs, while other LEDs are individually associated with corresponding switches. The LEDs in FIG. 1C may be similarly grouped as in FIG. 2A or FIG. 2B. It is noted that the current control circuit 14 and the switches may be configured as that illustrated in FIG. 1C, FIG. 1E, FIG. 1F or FIG. 1G. In one embodiment, the amount of LEDs in each group is equal to base 2 raised to n-th power, i.e., $2^1, 2^2, \ldots 2^n$, where n increases according to the order of turning on the LED groups. The LED groups may be arranged in concentric circles and be turned on from the center outwards. It is appreciated that the amount of LEDs in each group and their arrangement may be specifically designed according to corresponding applications.

Figure 3A:
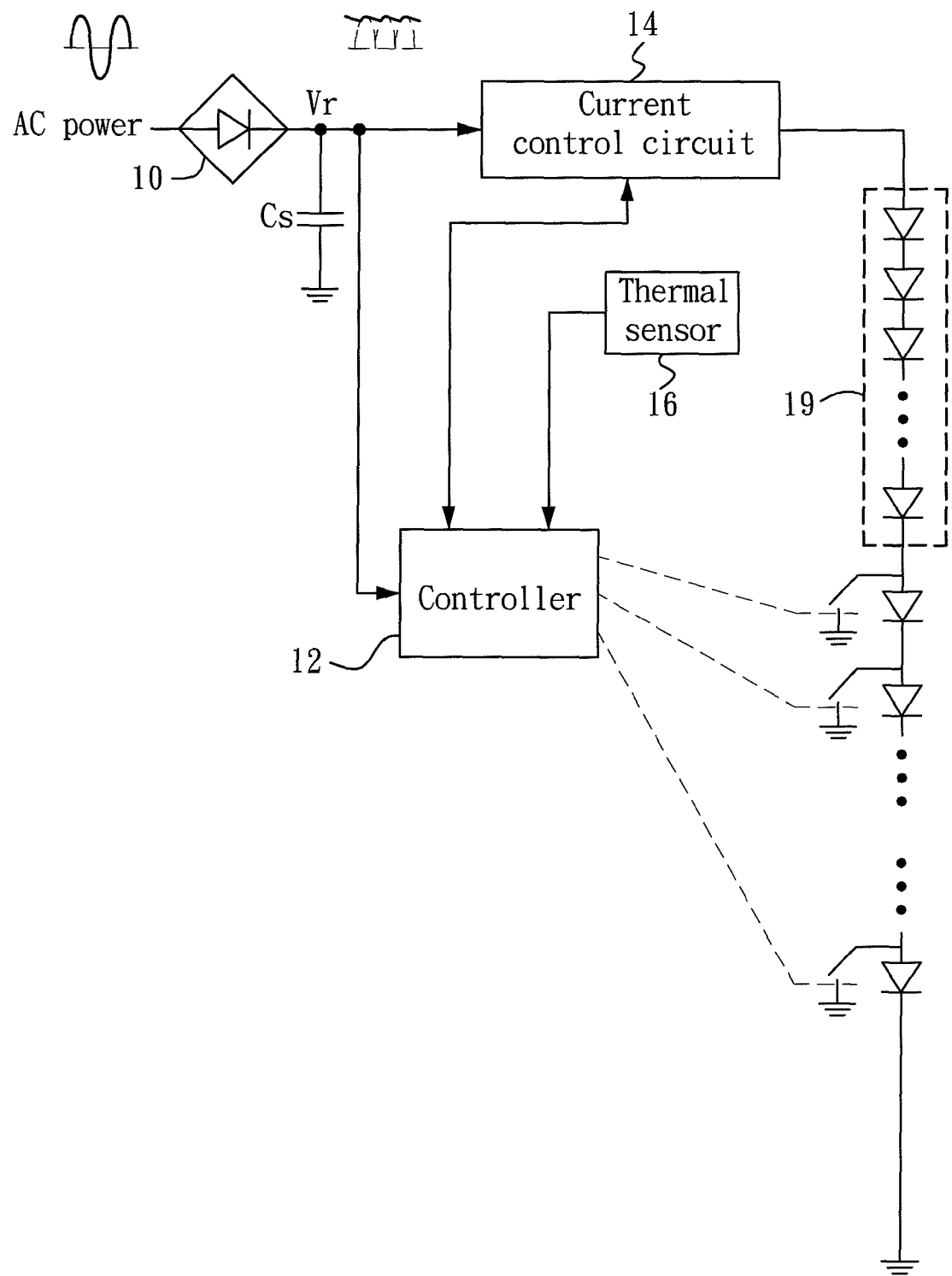
FIG. 3A shows an AC LED apparatus with high power efficiency according to a further embodiment of the present invention.
Figure 3B:
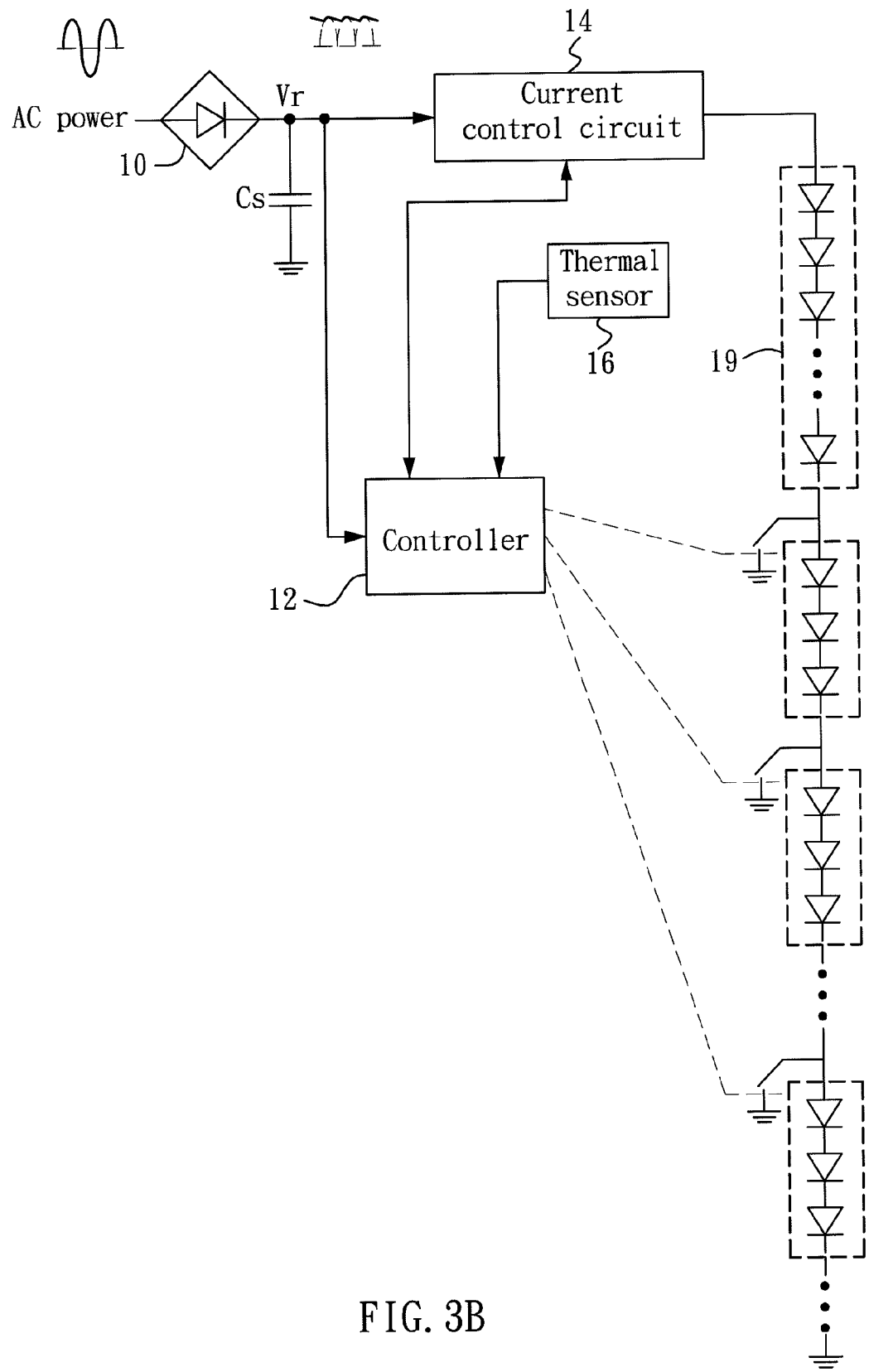
FIG. 3B shows an alternative AC LED apparatus to FIG. 3A.
Figure 3C:
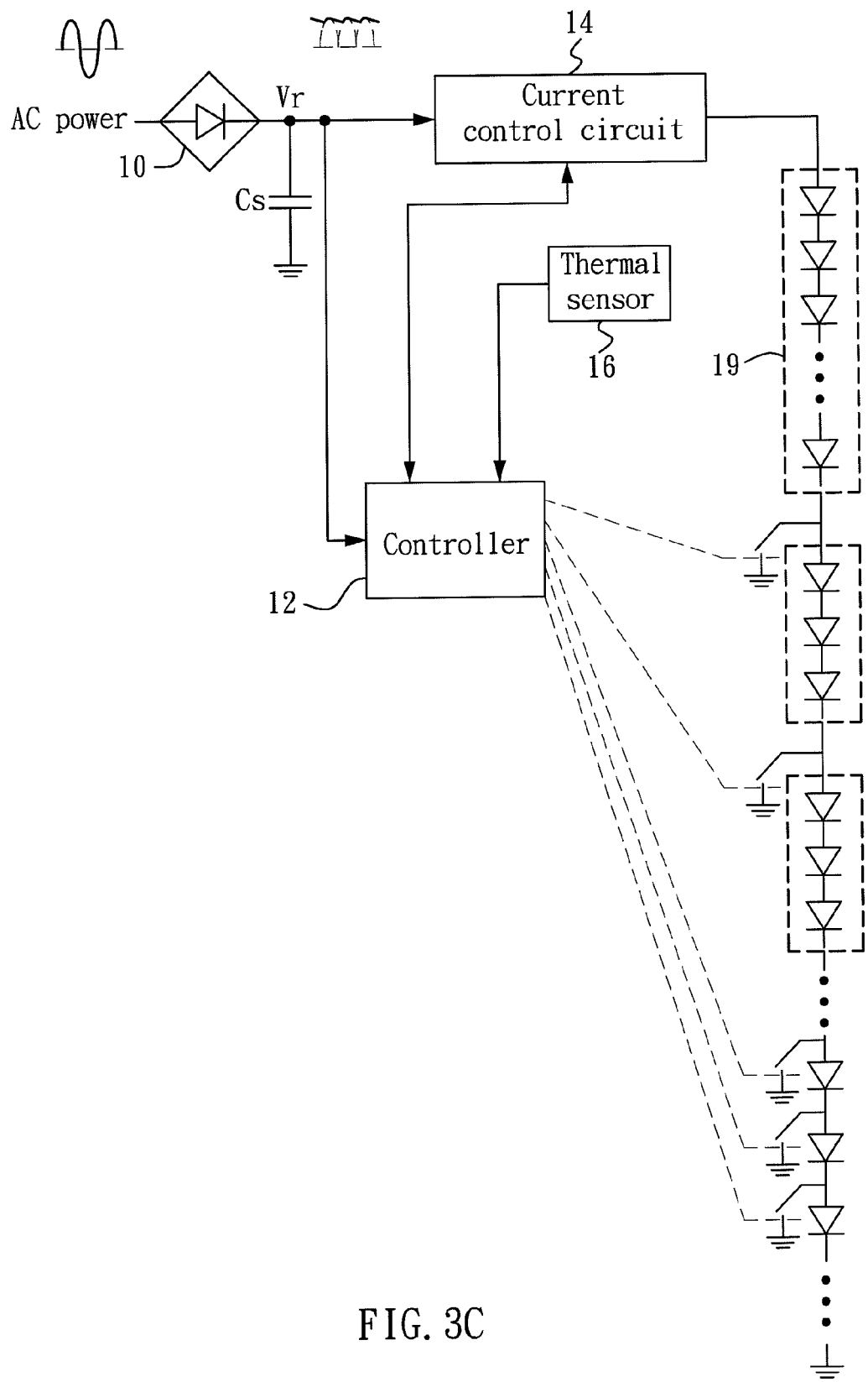
FIG. 3C further shows an alternative AC LED apparatus to FIG. 3A and FIG. 3B.

FIG. 3A shows an AC LED apparatus with high power efficiency according to a further embodiment of the present invention. The AC LED apparatus of the present embodiment is the same as the AC LED apparatus in FIG. 1A, except that the bridge rectifier 10 is succeeded by a smoothing capacitor Cs (that is coupled between the rectified voltage Vr and the ground), such that the rectified voltage Vr across the smoothing capacitor Cs has a smoothed ripple. Specifically speaking, the amplitude of the rectified voltage Vr falls smoothly due to the smoothing capacitor Cs until the power AC voltage becomes greater than the rectified voltage Vr. As a result, the rectified voltage Vr is never lower than a determined value. With respect to this consideration, some beginning LEDs 19 in the present embodiment may be always turned on at the presence of the verified voltage Vr without using a corresponding switch. Other LEDs following the beginning LEDs 19 may be individually associated with corresponding switches as configured in FIG. 1A. FIG. 3B shows an alternative AC LED apparatus to FIG. 3A, in which the LEDs other than the beginning LEDs 19 are grouped with corresponding switches. FIG. 3C further shows an alternative AC LED apparatus to FIG. 3A and FIG. 3B, in which, other than the beginning LEDs 19, some are grouped with corresponding switches while others are individually associated with corresponding switches. The AC LED apparatus of FIG. 1C may further include the smoothing capacitor Cs, and the LEDs in FIG. 1C may be similarly grouped as in FIG. 3A, FIG. 313 or FIG. 3C. It is noted that the current control circuit 14 and the switches may be configured as that illustrated in FIG. 1C, FIG. 1E, FIG. 1F or FIG. 1G.

Figure 4A:
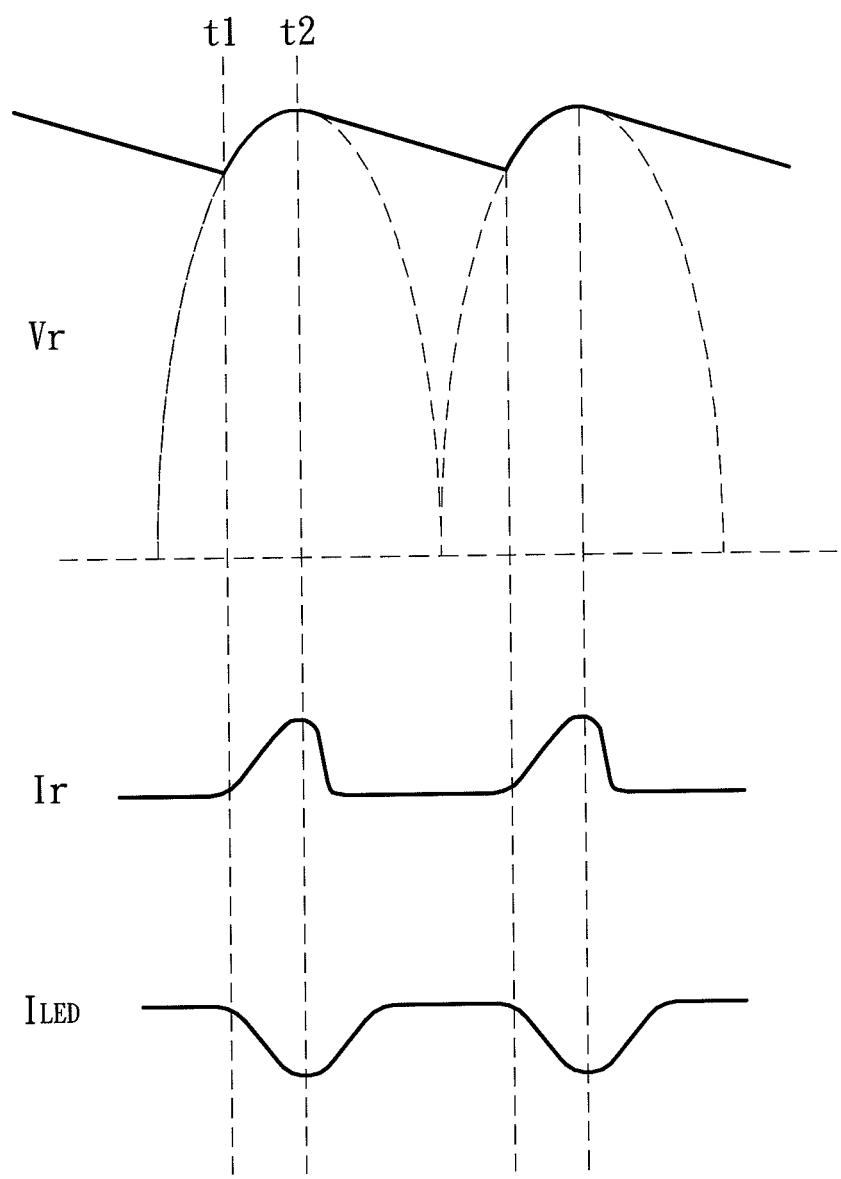
FIG. 4A shows exemplary waveforms of the rectified voltage Vr with smoothed ripple, corresponding current Ir and a redistributed LED current.
Figure 4B:
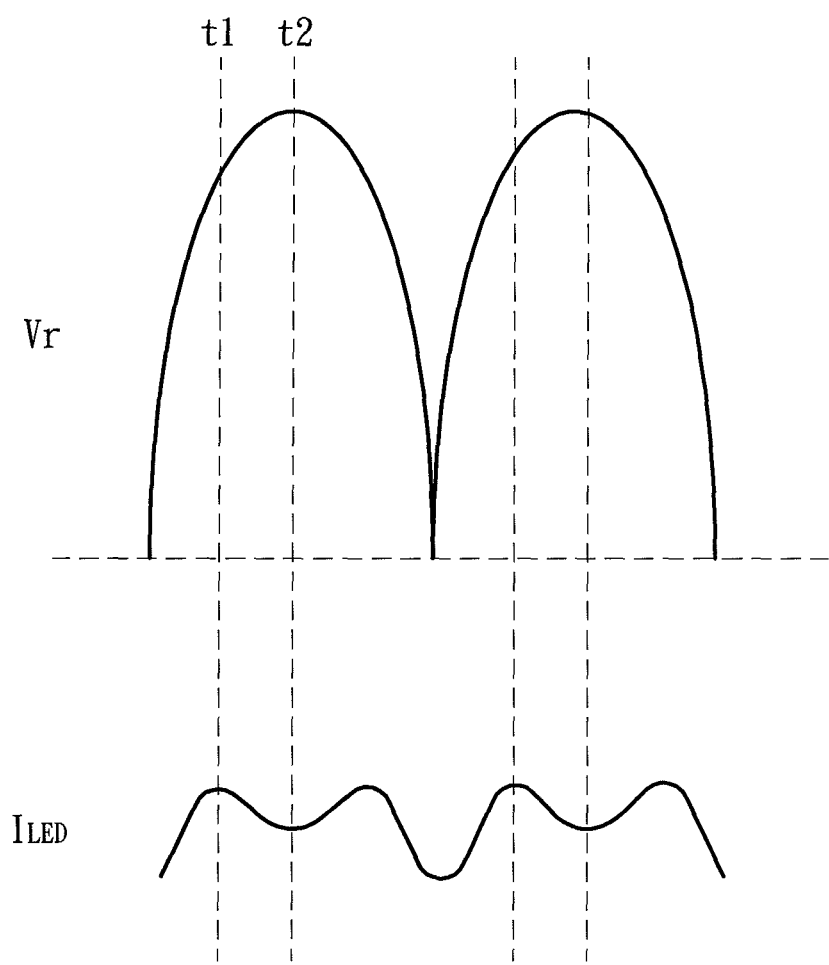
FIG. 4B shows further exemplary waveforms of the rectified voltage Vr without smoothed ripple and a redistributed LED current.

FIG. 4A shows exemplary waveforms of the rectified voltage Vr with smoothed ripple and a corresponding current Ir. It is observed that the current Ir is unevenly drawn from the AC power during t1-t2 within each half-cycle, thereby resulting in low power factor. With respect to this consideration, the current $I_{LED}$ flowing through the LEDs are specifically controlled with current distribution approximately reversed to that of the current Ir as shown in FIG. 4A. As a result, the redistributed LED current $I_{LED}$ is drawn from the AC power mainly in a period other than t1-t2 within each half-cycle. Accordingly, this power-redistribution scheme may lessen the burden of peak power on a power transmission system, thereby improving power factor and usage efficiency of AC power. It is noted that this power-redistribution scheme may be generalized and widely applied to a load other than the LEDs. FIG. 4B shows further exemplary waveforms of the rectified voltage Vr without smoothed ripple and a current $I_{LED}$ flowing through the LEDs. In FIG. 4B, the current $I_{LED}$ flowing through the LEDs may be specifically redistributed to lessen the burden of peak power on the power transmission system, thereby improving power factor and usage efficiency of AC power.

Figure 5A:
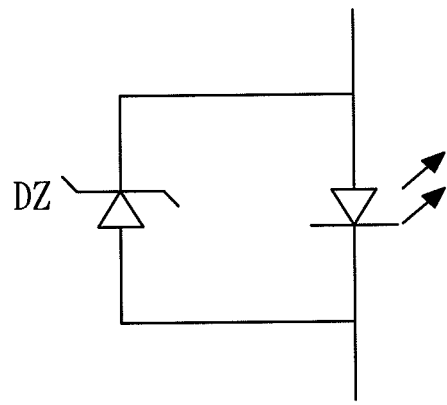
FIG. 5A shows a Zener diode electrically coupled in parallel with an LED.

According to one aspect of the present invention, the AC LED apparatus is capable of accommodating failed LED itself. It is shown in FIG. 5A a Zener diode DZ that is electrically coupled in parallel with an LED but with current direction opposite to each other. In case the LED fails, the LED current will reversely flow through the Zener diode DZ, thereby bypassing the failed LED.

Figure 5B:
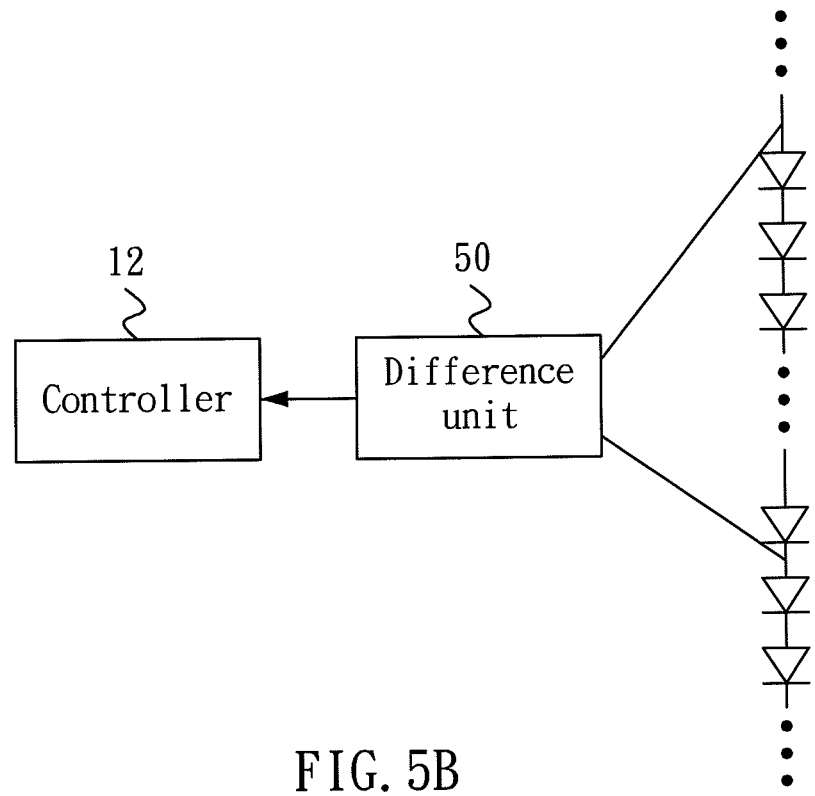
FIG. 5B shows a portion of the AC LED apparatus that is capable of detecting failed LED.

FIG. 5B shows a portion of the AC LED apparatus that is capable of detecting failed LED. Specifically, a difference unit 50 couples to receive two ends of a string of LEDs in order to obtain a voltage difference across the string of LEDs. The obtained voltage difference is outputted and fed to the controller 12. Based on the voltage difference, the controller 12 may detect abnormal voltage difference that indicates a failed LED or LEDs.

Figure 6:
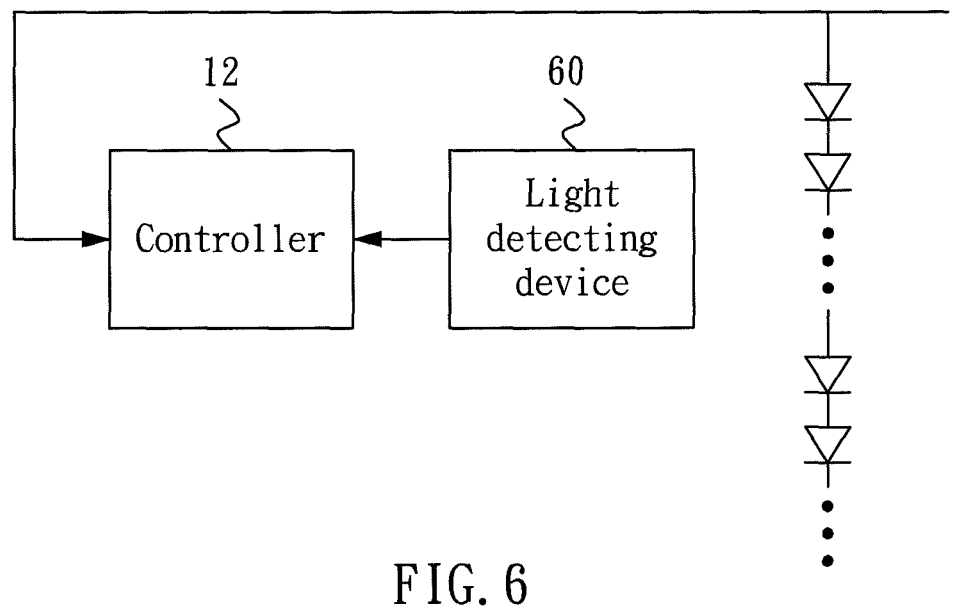
FIG. 6 shows a portion of an AC LED package with a light detecting device.

According to another aspect of the present invention, the AC LED apparatus is capable of self-calibrating lightness. FIG. 6 shows a portion of an AC LED package in which a light detecting device 60 such as a photoresistor (e.g., cadmium sulfide (CdS)) is used to detect the lightness. Although the photoresistor is illustrated here, it is appreciated that other light detecting device 60 such as photo-transistor, photodiode or any device capable of detecting light may be used as well. In case the controller 12 detects insufficiency in lightness according to an output of the light detecting device 60, the controller 12 may increase the number of turn-on LEDs or increase the LED current by the current control circuit 14, thereby getting back the supposed lightness. In another case, a number of light detecting devices may be utilized to respectively detect lightness of LEDs with different colors, which may then be individually calibrated, thereby calibrating color temperature of the AC LED apparatus in order to compensate for the color temperature drop, for example, encountered in an aging AC LED apparatus.

Figure 7A:
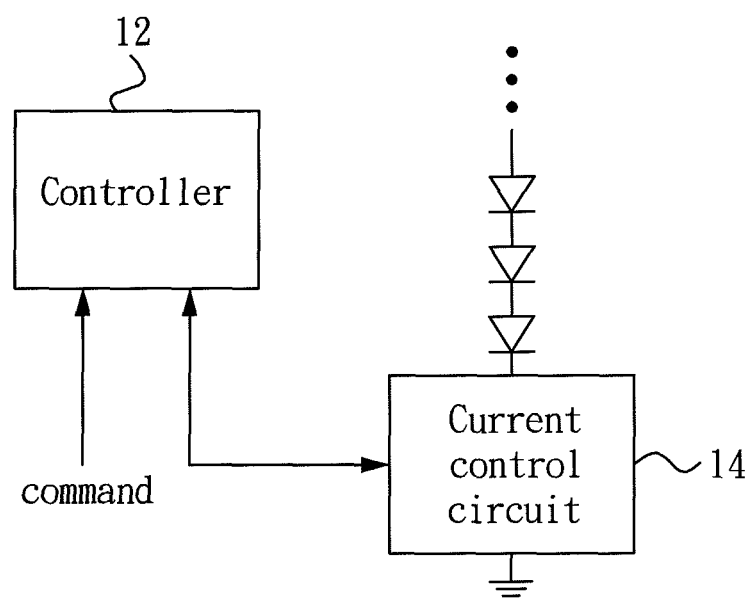
FIG. 7A shows a portion of the AC LED apparatus.
Figure 7B:
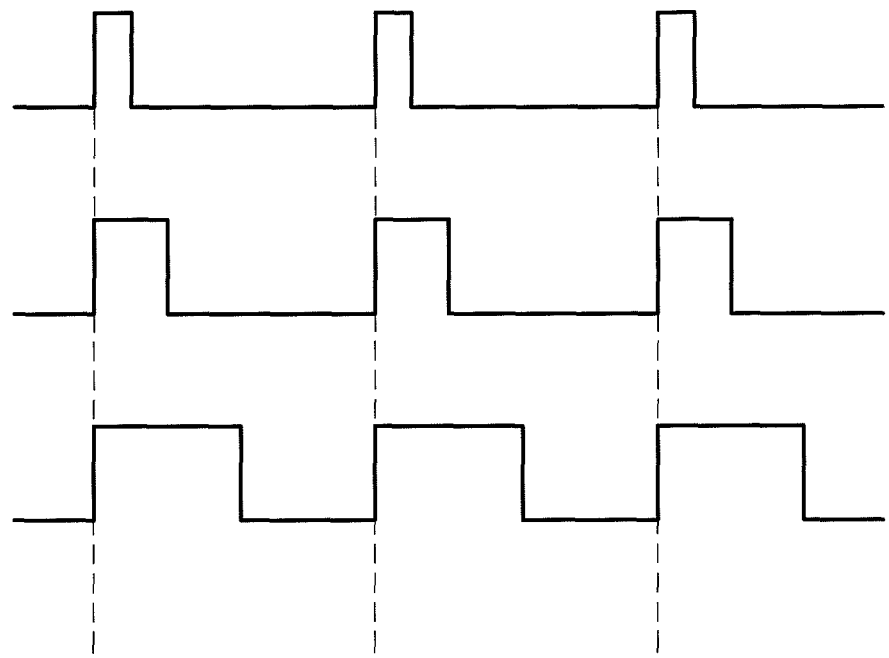
FIG. 7B shows some exemplary waveforms of LED current controlled by the current control circuit.

According to a further aspect of the present invention, the AC LED apparatus is capable of performing dimming or varying the lightness of the AC LED apparatus. FIG. 7A shows a portion of the AC LED apparatus and FIG. 7B shows some exemplary waveforms of LED current controlled by the current control circuit 14. Based on a received command issued, for example, from a wireless remote control or a wireline control interface, the controller 12 controls the current control circuit 14, which then controls turn-on duration of the LEDs according to pulse-width modulation (PWM) waveforms (FIG. 7B) having active width between fully-on and fully-off.

Although specific embodiments have been illustrated and described, it will be appreciated by those skilled in the art that various modifications may be made without departing from the scope of the present invention.

What is claimed is:

1. An alternating-current (AC) light-emitting diode (LED) apparatus, comprising:
    a rectifier configured to rectify a power AC voltage to generate a rectified voltage;
    a controller configured to monitor the rectified voltage;
    a plurality of serial-connected LEDs electrically coupled between the rectified voltage and a ground;
    a plurality of switches corresponding to at least a portion of the LEDs respectively, wherein one terminal of each switch is electrically coupled to one electrode of the corresponding LED or LEDs;
    a difference unit coupled to receive two ends of a string of the LEDs to obtain a voltage difference across the string of LEDs; and
    wherein the switches are controlled by the controller according to the rectified voltage and the obtained voltage difference is fed to the controller.

2. The AC LED apparatus of claim 1, wherein the rectifier is a bridge rectifier that passes a positive half-cycle of the power AC voltage and inverts a negative half-cycle of the power AC voltage, thereby resulting the full-wave rectified voltage.

3. The AC LED apparatus of claim 1, wherein another terminal of the switch is electrically coupled to the ground, the rectified voltage, a common node or another electrode of the corresponding LED.

4. The AC LED apparatus of claim 1, wherein the switch is a power metal-oxide-semiconductor (MOS) device.

5. The AC LED apparatus of claim 4, wherein one of source/drain of the power MOS device is coupled to an anode electrode of the corresponding LED, and a gate of the power MOS device is controlled by the controller.

6. The AC LED apparatus of claim 4, wherein one of source/drain of the power MOS device is coupled to an anode electrode of the corresponding LED, the other one of the source/drain of the power MOS device is coupled to a cathode electrode of the corresponding LED, and a gate of the power MOS device is controlled by the controller.

7. The AC LED apparatus of claim 1, wherein the switches are controlled by the controller in a manner that a number of the turn-on LED or LEDs is proportional to magnitude of the rectified voltage.

8. The AC LED apparatus of claim 1, wherein the switches are controlled by the controller in a manner that a cascaded forward voltage of the turn-on LED or LEDs is approximately equal to the rectified voltage.

9. The AC LED apparatus of claim 1, when a noise signal is detected, the controller disregards the noise signal, and the controller does not change status of the switches.

10. The AC LED apparatus of claim 1, further comprising a current control circuit electrically coupled in series with the plurality of serial-connected LEDs to detect an LED current flowing in the LEDs, and a result of the detected LED) current is fed to the controller.

11. The AC LED apparatus of claim 1, further comprising a thermal sensor configured to detect temperature of the LEDs, and a result of the detected temperature is fed to the controller.

12. The AC LED apparatus of claim 1, wherein at least one of the switches corresponds a group of the LEDs.

13. The AC LED apparatus of claim 1, further comprising a smoothing capacitor coupled between the rectified voltage and the ground, thereby resulting in the rectified voltage with a smoothed ripple.

14. The AC LED apparatus of claim 1, wherein the controller controls an LED current flowing through the LEDs, wherein current distribution through the LEDs is approximately reversed to current distribution drawn from the power AC voltage.

15. The AC LED apparatus of claim 1, further comprising a Zener diode electrically coupled in parallel with the corresponding LED, wherein a current direction of the Zener diode is opposite to a current direction of the corresponding LED.

16. The AC LED apparatus of claim 1, further comprising at least one light detecting device configured to detect lightness of the LEDs, wherein a result of the light detecting device is fed to the controller.

17. The AC LED apparatus of claim 16, wherein the light detecting device comprises one of the following: a photoresistor, a photo-transistor and a photodiode.

18. The AC LED apparatus of claim 16, wherein a plurality of the light detecting devices are configured to respectively detect lightness of the LEDs with different colors.

19. The AC LED apparatus of claim 1, wherein the controller further receives a command to control the LEDs via the current control circuit.

* * * * *